(12) United States Patent
Eriksson et al.

(10) Patent No.: US 7,432,697 B2
(45) Date of Patent: Oct. 7, 2008

(54) UNIVERSAL INPUT DEVICE FOR A TAP CHANGER

(75) Inventors: Per Eriksson, Borlange (SE); Lahan Konov, Ludvika (SE)

(73) Assignee: ABB Technology Ltd. (CH)

(*) Notice: Subject to any disclaimer, the term of this patent is extended or adjusted under 35 U.S.C. 154(b) by 63 days.

(21) Appl. No.: 11/358,198

(22) Filed: Feb. 21, 2006

(65) Prior Publication Data

US 2007/0194764 A1    Aug. 23, 2007

(51) Int. Cl.
  *G05B 24/02* (2006.01)
(52) U.S. Cl. .......... 323/341; 323/257
(58) Field of Classification Search ............. 323/255, 323/256, 257, 258, 340, 341, 343
  See application file for complete search history.

(56) References Cited

U.S. PATENT DOCUMENTS

| | | | | |
|---|---|---|---|---|
| 4,843,339 A | | 6/1989 | Burt et al. | 330/10 |
| 5,581,173 A | | 12/1996 | Yalla et al. | 323/257 |
| 5,642,290 A | * | 6/1997 | Reilly et al. | 700/298 |
| 5,736,827 A | | 4/1998 | Dohnal et al. | 318/696 |
| 6,351,105 B2 | * | 2/2002 | Suzuki | 323/255 |
| 6,486,641 B2 | * | 11/2002 | Scoggins et al. | 323/257 |
| 6,664,771 B2 | * | 12/2003 | Scoggins et al. | 323/257 |
| 2001/0024111 A1 | * | 9/2001 | Suzuki | 323/255 |
| 2003/0062878 A1 | * | 4/2003 | Scoggins et al. | 323/257 |
| 2005/0068013 A1 | * | 3/2005 | Scoggins | 323/258 |
| 2007/0057651 A1 | * | 3/2007 | Hoffman | 323/258 |
| 2007/0057652 A1 | * | 3/2007 | Hoffman et al. | 323/258 |

FOREIGN PATENT DOCUMENTS

| | | |
|---|---|---|
| EP | 0 637 122 | 2/1995 |
| WO | WO 97/01808 | 1/1997 |

* cited by examiner

*Primary Examiner*—Jeffrey L Sterrett
(74) *Attorney, Agent, or Firm*—St. Onge Steward Johnston & Reens LLC

(57) ABSTRACT

A control system providing a universal input for receiving a control signal for actuating tap-changing equipment. The system accommodates virtually any signal voltage level commonly used for control of the tap-changing equipment, modifies the received signal to a desired format, and inputs the modified signal to a controller for decoding and actuation of the tap-changing motor. The system is fully electronic, eliminating the use of electromechanical contacts for control of the tap-changer and providing a flexible approach to monitoring and diagnostics even from a location remote from the tap-changing equipment.

18 Claims, 4 Drawing Sheets

UNIVERSAL INPUT DEVICE FOR A TAP CHANGER

FIELD OF THE INVENTION

The invention relates to a signal converting system for a tap changer, more specifically, the invention relates to an electronic signal converting device capable of receiving a variety of differing signal levels with the same equipment.

BACKGROUND OF THE INVENTION

The world of High Voltage technology lacks coherent, universal standards for the various High Voltage equipment used. As a result, there is a relatively large variety of national standards from country to country presently a real challenge to High Voltage equipment manufacturers. This is especially so in the field of High Voltage tap-changing equipment.

Tap-changers used, for example, to change the tap settings on a commercial transformer, utilize input signals for control and monitoring. Known tap-changers utilize electromechanical contacts for control.

A user typically connects their equipment (e.g. transformer) to the tap-changer motor drive. Digital signals are an effective means to control and monitor the functioning of the tap-changer. In the digital world, a "1" and a "0" describe a status of full voltage (On) or zero voltage (Off). In High Voltage applications, these two statuses are typically described by, for example: AC of 50-60 Hz, 110-240V±15% of rated voltage, or DC of 24-48V±10% of rated voltage. In the traditional motor drive, this is a user choice, where the motor drive must be equipped with a special apparatus to interface with a particular voltage for switching of the electromechanical contacts. Accordingly, a different apparatus is required to be used for different voltage levels.

Each of the above-mentioned voltage levels and configurations is individually relatively easy to design for, but not the total combination of variations. For example, the problem may be described as follows: actuation (of the tap-changer) should only occur upon the receipt of a valid signal, however, with such a large range of valid signal levels as described above, a disturbance signal for 220VAC very likely will be a valid signal level, for example, for other voltage schemes. Therefore, accurate signal recognition is an important issue.

In addition, if a digital input (DI) is constructed to function for relatively low voltage levels and consumes several mA of current (at the relatively low voltage levels), it will correspondingly dissipate a relatively large amount of energy for higher voltages. Moreover, usually the DI must be isolated and protected for over-voltage. At times, the system may be required to consume a relatively large amount of current for a relatively short period of time. This is especially so for a DI that is energy economical. The higher current contributes to the burning of oxides on the digital output (DO) in the case that it is a relay.

Still further, the signals must be converted to a suitable digital signal with relatively high resolution.

In addition, traditional control systems utilize electromechanical contacts, which are limited in the voltage levels that may be applied thereto, but are also disadvantageously subject to mechanical wear and tear.

Therefore, what is desired then, is a system and method for accurately handling all of the common voltage variations commonly encountered within a switchyard with the same equipment for a tap-changer.

It is further desired to provide a system and method that reduces and/or eliminates the use of electromechanical contacts for control of the tap-changer.

It is still further desired to provide a system and method that provides a flexible approach to monitoring and diagnostics of a tap-changer, even from a remote location.

SUMMARY OF THE INVENTION

These and other objectives are achieved by the provision of system that can recognize and accept multi-voltage (universal) digital input signals for use as a connection between the user equipment and the tap-changer motor drive. In one advantageous embodiment, the system may accept AC or DC voltages in a range from about 10V-390V. In addition, the power to the electronics is derived from the input signal itself (a self-powered solution). Accordingly, because the system can accept many differing voltage levels, the former apparatus variations are reduced to a single solution.

This provides a distinct advantage for both the equipment manufacturer and the user. For example, this universal input system allows the manufacturer to tool up for production of only one type of unit, and the user does not have to store various system and system parts proprietary to particular voltage levels.

Objects of the invention are further achieved by the elimination of electromechanical contacts, which have been replaced by use of electronics. The reduction and/or elimination in the number electromechanical contacts, which are subject to mechanical failure, provides for a system with increased reliability.

Electronics further allow for greatly improved monitoring and diagnostics, in particular, over a network connection from a remote location. In addition, programming and settings may also be remotely executed via the electronic system.

For example, the input channel utilizes electronics with the voltage variations being handled within the software of a microprocessor. The level to distinguish a logical "0" or a logical "1" being set and controlled within the software.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

In one advantageous embodiment, a signal converting system for a tap changer is provided comprising, an input signal for driving a tap changer motor drive and an electronic voltage converting device for receiving the input signal and for outputting a digital signal corresponding to the input signal.

The system is provided such that the output digital signal controls the tap changer motor drive, then can move the connected tap changer to a tap selection based on the input signal or other common control tasks such as operation inhibit of the motor drive, external emergency stop of the motor drive or go to nth position (tap selection). The system is further provided such that the electronic voltage converting device is capable of receiving differing input signal voltages from about 10V to about 390V, such that a single electronic voltage converting device may be used with different input signal voltage levels.

In another advantageous embodiment, a signal converting system for a tap changer is provided comprising, an input signal for driving a tap changer motor drive and an electronic voltage converting device for receiving the input signal and for outputting a digital signal corresponding to the input signal. The electronic voltage converting device is provided having a voltage protector and a voltage rectifier for providing over-voltage protection and voltage rectification, and a current controller for providing a current load upon an increase in the voltage level of the input signal. The electronic voltage converting device further has a voltage regulator to provide a reference voltage, and a voltage to duty converter for converting a frequency and duty cycle of the input signal. The system still further comprises a processing unit for processing the received signal. The system is provided such that the output digital signal controls the tap changer motor drive, then can move the connected tap changer to a tap selection based on the input signal or other common control tasks such as, operation inhibit of the motor drive, external emergency stop of the motor drive to go to nth position (tap selection).

Other objects of the invention and its particular features and advantages will become more apparent from consideration of the following drawings and accompanying detailed description.

DETAILED DESCRIPTION OF THE DRAWINGS

Figure 1:
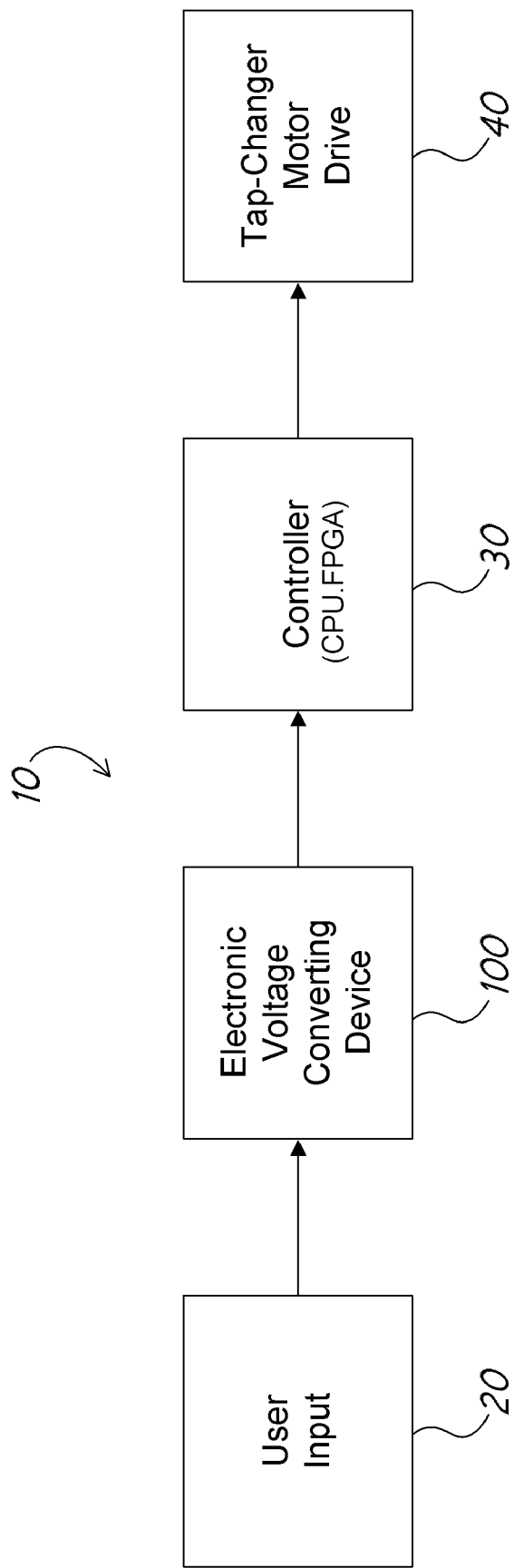
FIG. 1 is a block diagram of one advantageous embodiment of the present invention.

Referring now to the drawings, wherein like reference numerals designate corresponding structure throughout the views.

FIG. 1 generally depicts system 10, which includes user input signal 20, electronic voltage converting device 100, controller 30 and tap-changer motor drive 40.

User input signal 20 may comprise virtually any common commercial input signal ranging from about 10V to about 390V±10-15% AC or DC and AC from 50-60 Hz. This is highly desirable because system 10 provides a device that includes an essentially universal input, being capable of reception of all common commercial signal levels. This allows the user to become familiar with and stock parts for only a single system, which can be used for each of the user's differing switching applications.

User input signal 20 is coupled to electronic voltage converting device 100, which is provided to receive and convert the signal before outputting a signal to controller 30. Electronic voltage converting device 100 is provided having universal input capability, being able to receive and convert user input signal 20 within the range of from about 10V to about 390V±10-15% AC or DC and AC from 50-60 Hz as stated above. Electronic voltage converting device 100 will be discussed in greater detail in connection with FIGS. 2 and 3.

Controller 30 is coupled to electronic voltage converting device 100 and receives a converted output signal that corresponds to user input signal 20. Controller 30 then "decodes" or interprets the received signal to actuate tap-changer motor drive 40 to, for example, change a tap-setting on a transformer. It is contemplated that controller 30 may comprise but is not limited to, a central processing unit (CPU), a field programmable gate array (FPGA), and combinations thereof.

Tap-changer motor drive 40 may comprise any typical motor drive unit as is commonly used in industry for accomplishing, for example, a tap change, or other common control tasks such as, operation inhibit of the motor drive, external emergency stop of the motor drive or go to nth position (tap selection).

Figure 2:
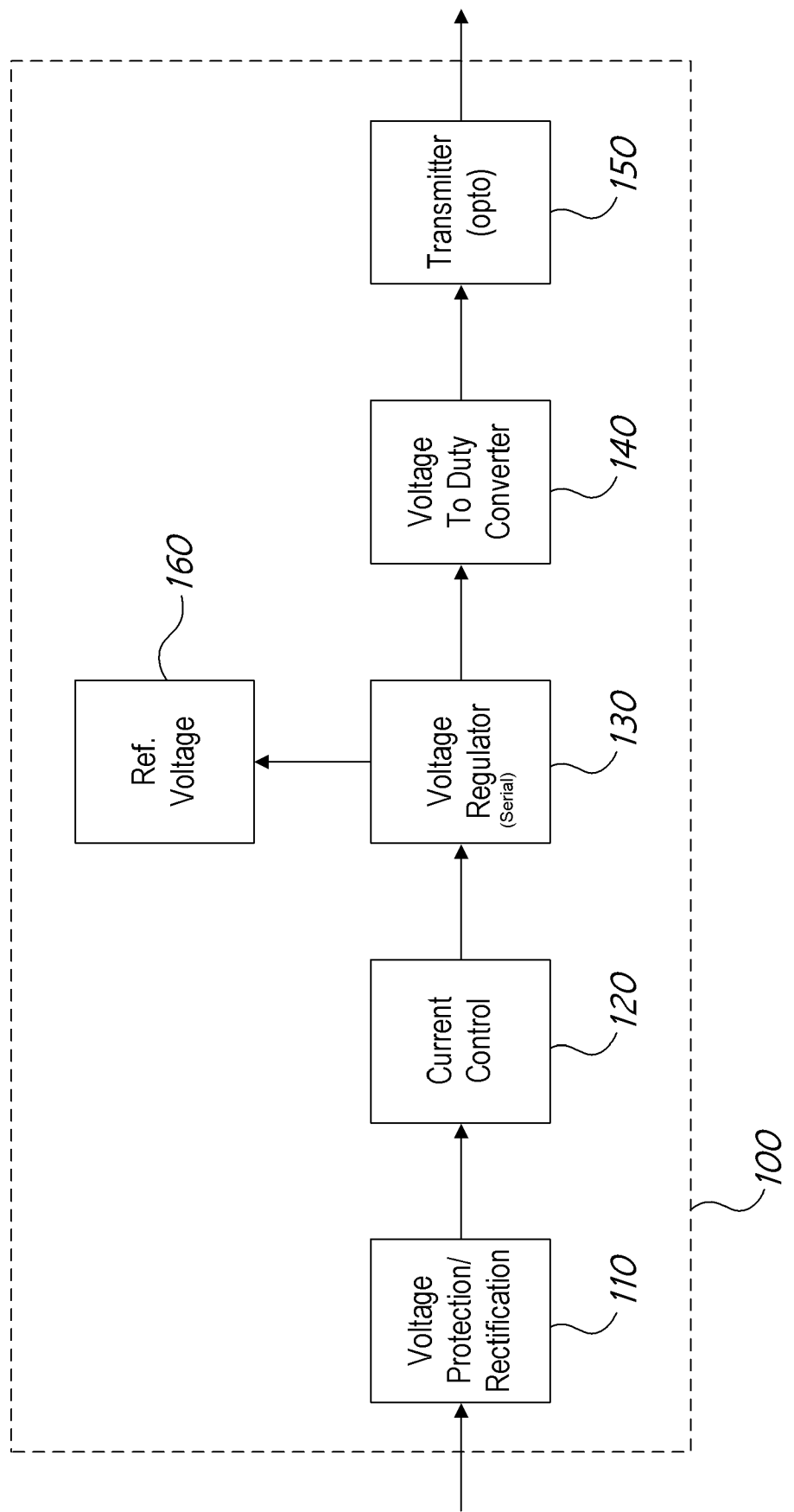
FIG. 2 is a block diagram according to FIG. 2.
Figure 3:
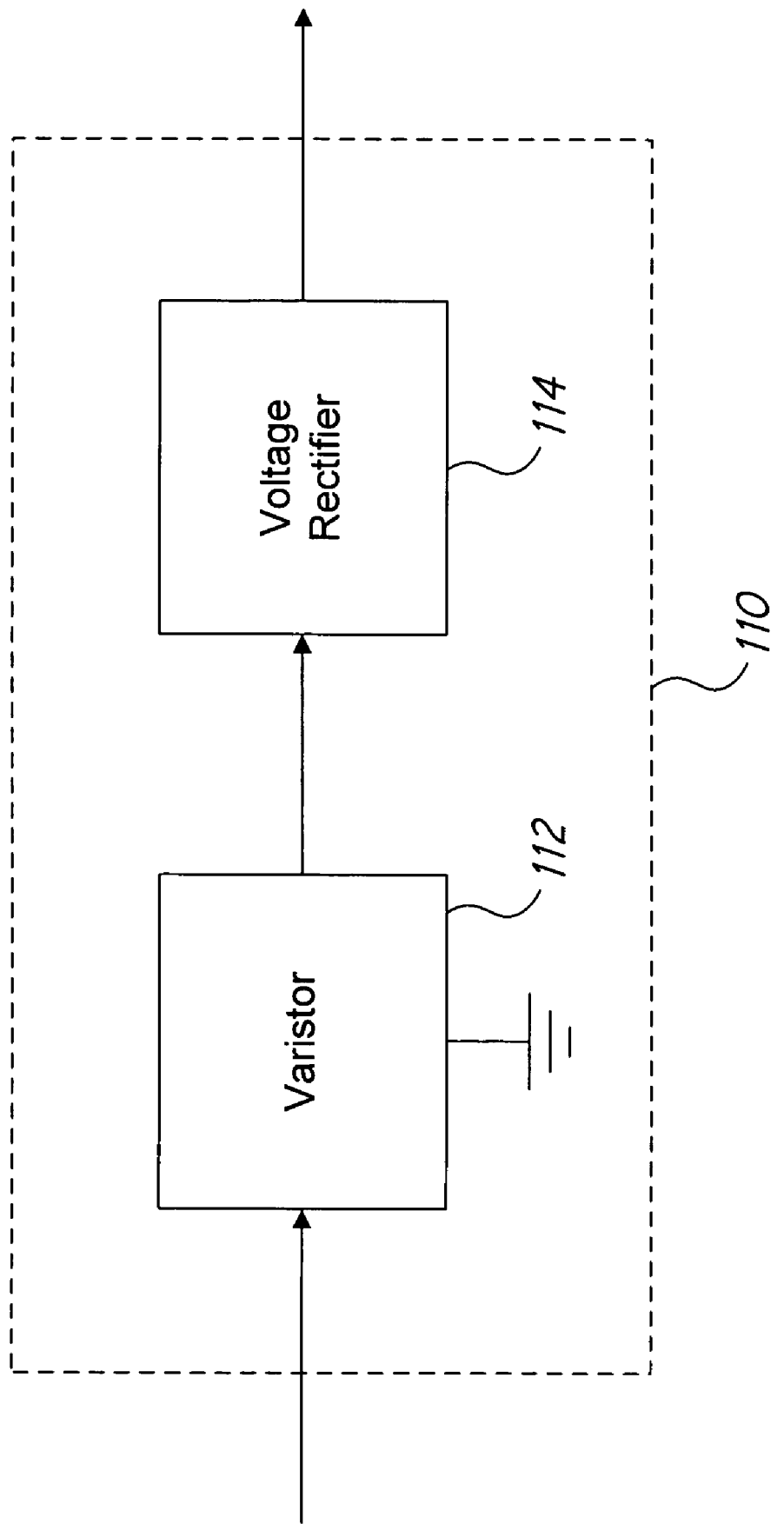
FIG. 3 is a block diagram according to FIG. 3

Turning now to FIGS. 2 and 3, electronic voltage converting device 100, in this advantageous embodiment, generally comprises voltage protection/rectification 110, current control 120, voltage regulator 130, voltage to duty converter 140 and transmitter 150.

Voltage protection/rectification 110 provides for over-voltage protection as well as rectification of the received user input signal 20. It is contemplated that the over-voltage protection may comprise, for example, a arrestor 112 provided to shunt any excess voltage to ground to prevent damage to the equipment in the event of an over-voltage condition.

Arrestor 112 is coupled to voltage rectifier 114 (FIG. 3), which may comprise virtually any commercially available rectifier for converting user input signal 20. It should be noted that, while the received signal is rectified at this stage, it is not filtered.

Voltage protection/rectification 110 is coupled to current control 120. Current control 120 is provided to protect system 10 from an over current condition. For example, because user input signal 20 may vary from about 10V to about 390V±10-15% AC or DC and AC from 50-60 Hz, the higher the voltage level of user input signal 20, the higher the associated current will be. To counteract this process, current control 120 monitors the current load such that, when the measured current reaches about 0.4 mA, a current load is created or developed by current control 120 for a few microseconds to maintain control of the overall circuit current.

Current control 120 is further coupled to voltage regulator 130. Here, the signal voltage is manipulated and altered as needed. For example, system 10 may be described as a self-powered system because power for running the electronics is derived from the received signal. This is highly desirable as is may not always be convenient to have to supply power to tap-changing equipment located in a user's switch yard.

In this particular embodiment, voltage regulator 130 receives the signal and generates a reference voltage 160 that may further be used by system 10. It is contemplated that voltage regulator 130 may comprise, in one advantageous embodiment, a serial regulator.

Voltage regulator 130 is coupled to voltage to duty converter 140. At this stage, the received signal may further be converted to a relatively low frequency signal, for example but not limited to around 1.5 KHz. The signal may further have a varying duty cycle from about 50% to about 99%, and typically 8-bit resolution. It should by noted that the ADC current relatively low, typically in a range of approximately 40 µA.

Voltage to duty converter 140 may, in one advantageous embodiment, be coupled to transmitter 150. Once the received signal has been appropriately modified by electronic voltage converting device 100, the signal may be output by transmitter 150 to controller 30 for decoding and processing.

In a particular advantageous embodiment, transmitter 150 may comprise, for example, an opt-couple device, which advantageously has relatively low current consumption. The output signal may further comprise a pulse-width modulated (PWM) signal, corresponding to user input signal 20. In this manner, virtually any commercially available input may be coupled to electronic voltage converting device 100 without need of specifically selecting the device based on the particular voltage input signal. In addition, system 10 is fully electronic, substantially eliminating the electromechanical contacts commonly utilized in existing systems, thereby reducing chances of system failure due to wear and tear electromechanical contacts are known for.

In addition, as system 10 is fully electronic, this provides for ease of monitoring of system 10 over, for example, a network connection (not shown).

Figure 4:
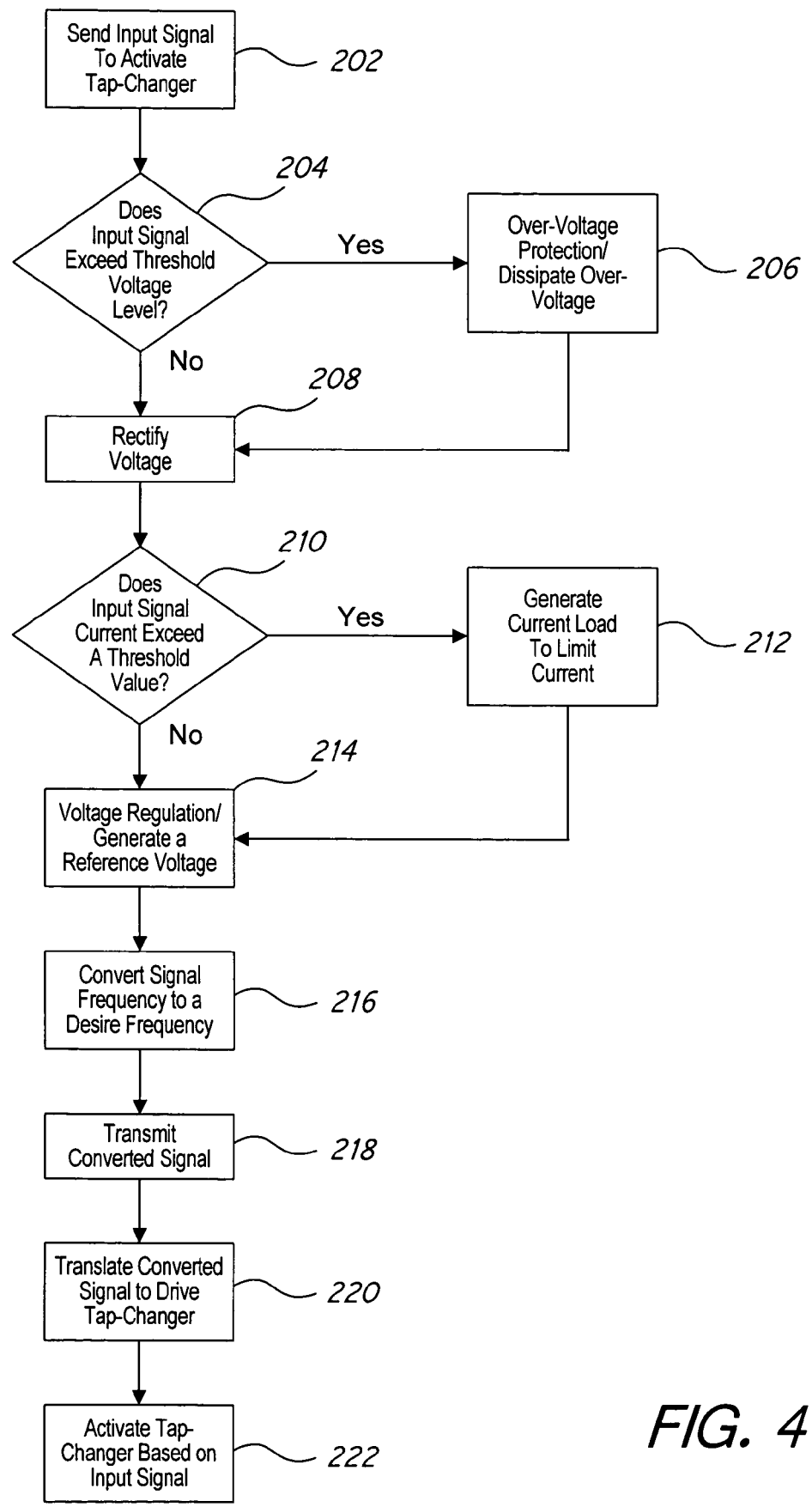
FIG. 4 is a flow diagram according to FIG. 2.

Referring now to FIG. 4, a flow diagram of the advantageous embodiment discussed in connection with FIGS. 1-3 is illustrated.

Initially, the system 10 receives an input signal 202, which corresponds to a desired actuation for the tap-changer. System 10 monitors the received signal to determine whether the received signal exceeds a threshold voltage level 204. If the received signal exceeds a threshold level, the over voltage protection will dissipate the excess voltage 204 to prevent damage to the system.

As previously stated, the over voltage protection may comprise a arrestor that will shunt excess voltage away from the system. It is contemplated that the over voltage protection may include an inverse time delay characteristics such that upon a sharp increase in voltage, the over voltage protection with shunt excess voltage away from the system relatively quickly.

If the received signal does not exceed the threshold value or any excess voltage has been shunted away from the system, the remaining signal is then rectified 208.

The system then determines whether the received signal current exceeds a threshold value 210. If so, the system will generate a current load to limit the signal current 212. As stated in connection with FIGS. 1-3, this threshold value may be approximately 0.4 mA. If the current does not exceed the threshold value or the system has limited the current via the current load, the system then provides voltage regulation for the signal 214. In this manner, a reference voltage may be generated for use by the system such that an external or separate power source for powering the electronics is unnecessary.

The system may then convert a frequency of the received signal to a desired frequency 216. As previously mentioned, in one advantageous embodiment, the frequency is converted to approximately 1.5 KHz.

Once the signal frequency is converted, the system may then transmit the altered signal 218 to a controller. The system may then translate or decode the signal 220 to determine the correct action to take with the tap-changer equipment. Once this is determined, the tap-changer is actuated 222 to accomplish the desired action.

While this description is primarily directed toward control of the tap-changing equipment, it is contemplated that as the system is fully electronic, monitoring of the tap-changing equipment as well as the control equipment itself is possible. In this manner, monitoring and diagnostics for the system are greatly enhanced and may be accomplished, for example, remotely from the equipment over a network connection.

It should be noted that, while various functions and methods have been described and presented in FIG. 4 in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

System 10 then provides a fully integrated single solution for accurately handling all of the common voltage variations commonly encountered within a switchyard for a tap-changer. Additionally, system 10 effectively eliminates use of electromechanical contacts for control of the tap-changer, thereby increasing overall system reliability. Finally, system 10 provides a highly a flexible approach to monitoring and diagnostics of a tap-changer, even from a remote location.

Although the invention has been described with reference to particular ingredients and formulations and the like, these are not intended to exhaust all possible arrangements or features, and indeed many other modifications and variations will be ascertainable to those of skill in the art.

What is claimed is:

1. A signal converting system for a tap changer comprising:
   an input signal for driving a tap changer motor drive;
   an electronic voltage converting device for receiving said input signal and for outputting a digital signal corresponding to said input signal;
   said output digital signal controlling the tap changer motor drive based on said input signal; and
   said electronic voltage converting device operable to receive all input signal voltages in a range extending from about 10V to about 390V, such that a single electronic voltage converting device is used with all input signal voltage levels ranging from about 10V to about 390V.

2. The signal converting system according to claim 1 wherein said electronic voltage converting device is capable of converting both AC and DC input signals.

3. The signal converting system according to claim 1 wherein said electronic voltage converting device comprises a voltage protector and a voltage rectifier.

4. The signal converting system according to claim 3 wherein said voltage protector comprises a varistor.

5. The signal converting system according to claim 1 wherein said electronic voltage converting device comprises a current controller.

6. The signal converting system according to claim 5 wherein said current controller increases a current load for a determined time period upon an increase in voltage.

7. The signal converting system according to claim 6 wherein the current load is created at a current in a range of about 0.1 mA to about 2 mA.

8. The signal converting system according to claim 1 wherein said electronic voltage converting device comprises a voltage regulator.

9. The signal converting system according to claim 8 wherein said voltage regulator comprises a serial regulator.

10. The signal converting system according to claim 1 wherein said electronic voltage converting device comprises a voltage to duty converter for converting a frequency and duty cycle of said input signal.

11. The signal converting system according to claim 10 wherein said input signal is converted to a frequency in the range of about 0.5 KHz to about 5 KHz.

12. The signal converting system according to claim 1 wherein said electronic voltage converting device comprises an opto transmitter.

13. The signal converting system according to claim 12 wherein said opto transmitter utilizes pulsewidth modulation.

14. The signal converting system according to claim 1 further comprising a processing unit.

15. The signal converting system according to claim 14 wherein said processing device is selected from the group consisting of: a CPU, a FPGA, and combinations thereof.

16. A signal converting system for a tap changer comprising:
   an input signal for driving a tap changer motor drive;
   an electronic voltage converting device for receiving said input signal and for outputting a digital signal corresponding to said input signal, said electronic voltage converting device having:
   a voltage protector and a voltage rectifier for providing over-voltage protection and voltage rectification;
   a current controller for providing a current load upon an increase in the voltage level of said input signal;
   a voltage regulator to provide a reference voltage;
   a voltage to duty converter for converting a frequency and duty cycle of said input signal; and
   a processing unit for processing the received signal;
   said output digital signal controlling the tap changer motor drive to a tap selection based on said input signal.

17. The signal converting system according to claim 16 wherein said electronic voltage converting device is capable of receiving differing input signal voltages from about 10V to about 390V, such that a single electronic voltage converting device may be used with different input signal voltage levels.

18. The signal converting system according to claim 16 wherein said input signal comprises a control task selected from the group consisting of: operation inhibit of the motor drive, external emergency stop of the motor drive, go to nth position, and combinations thereof.

* * * * *